(12) United States Patent
Hoffmann et al.

(10) Patent No.: US 8,373,295 B2
(45) Date of Patent: *Feb. 12, 2013

(54) METHOD FOR OPERATING A POWER PLANT

(75) Inventors: Jürgen Hoffmann, Untersiggenthal (CH); Thomas Meindl, Kirchdorf (CH)

(73) Assignee: ALSTOM Technology Ltd, Baden (CH)

( * ) Notice: Subject to any disclaimer, the term of this patent is extended or adjusted under 35 U.S.C. 154(b) by 713 days.

This patent is subject to a terminal disclaimer.

(21) Appl. No.: 12/541,665

(22) Filed: Aug. 14, 2009

(65) Prior Publication Data

US 2010/0031667 A1 Feb. 11, 2010

Related U.S. Application Data

(63) Continuation of application No. PCT/EP2008/051634, filed on Feb. 12, 2008.

(30) Foreign Application Priority Data

Feb. 14, 2007 (CH) ........................................ 0248/07

(51) Int. Cl.
*F01D 15/10* (2006.01)
(52) U.S. Cl. ......................................................... 290/52
(58) Field of Classification Search .................. 290/27, 290/47, 52
See application file for complete search history.

(56) References Cited

U.S. PATENT DOCUMENTS

| | | | |
|---|---|---|---|
| 4,219,738 A | 8/1980 | Griesinger | |
| 4,786,852 A | 11/1988 | Cook | |
| 5,520,512 A | 5/1996 | Walker et al. | |
| 5,554,509 A | 9/1996 | Colucci et al. | |
| 5,689,141 A | 11/1997 | Kikkawa et al. | |
| 5,694,026 A | 12/1997 | Blanchet | |
| 6,118,238 A * | 9/2000 | Munro et al. | 318/141 |
| 6,250,877 B1 * | 6/2001 | Westphal et al. | 415/17 |
| 6,519,170 B2 | 2/2003 | Lacaze et al. | |
| 6,628,005 B2 | 9/2003 | Nelson et al. | |

(Continued)

FOREIGN PATENT DOCUMENTS

| AU | 785125 B2 | 10/2002 |
|---|---|---|
| CN | 1822464 A | 8/2006 |

(Continued)

OTHER PUBLICATIONS

Offringa, L.L.J. and Duarte, J.L. "A 1600 Kw IGBT Converter With Interphase Transformer for High Speed Gas Turbine Power Plants" Proc. IEEE—IAS Conf. 2000, 4, Oct. 8-12, 2000, Rome, pp. 2243-2248.

(Continued)

*Primary Examiner* — Tho D Ta

(74) *Attorney, Agent, or Firm* — Volpe and Koenig, P.C.

(57) ABSTRACT

A method is provided for operating a power station (10), with turbine shafting (11), that includes a gas turbine (12) and a generator (18) driven directly by the gas turbine (12) and that generates alternating current with an operating frequency, the output of the generator is connected with an electrical grid (21) with given grid frequency. An electronic decoupling apparatus or variable electronic gearbox (27) is arranged between the generator (18) and the grid (21), the decoupling apparatus decouples the operating frequency from the grid frequency. Increased service life of the station and reduced emissions are achieved in that, when there are longer-lasting changes in the grid frequency, the mechanical or aerodynamic rotational speed of the gas turbine (12) is kept constant and the output of the gas turbine (12) is adjusted without a delay.

14 Claims, 7 Drawing Sheets

U.S. PATENT DOCUMENTS

| | | |
|---|---|---|
| 6,979,914 B2 | 12/2005 | McKelvey et al. |
| 7,084,524 B2 | 8/2006 | Lacaze et al. |
| 7,317,998 B2 | 1/2008 | Lacaze et al. |
| 7,321,835 B2 | 1/2008 | Lacaze et al. |
| 7,466,574 B2 | 12/2008 | Lacaze |
| 7,578,658 B2 | 8/2009 | Larsen |
| 7,944,094 B2 * | 5/2011 | Hoffmann .................... 307/151 |
| 2002/0079706 A1 | 6/2002 | Rebsdorf et al. |
| 2003/0137855 A1 | 7/2003 | Miguchi |
| 2003/0189339 A1 | 10/2003 | Gupta et al. |
| 2004/0119293 A1 | 6/2004 | McKelvey et al. |
| 2004/0222640 A1 | 11/2004 | McKelvey et al. |
| 2004/0264089 A1 * | 12/2004 | Furuya et al. .................... 361/92 |
| 2005/0001598 A1 | 1/2005 | Belokon et al. |
| 2005/0237774 A1 | 10/2005 | Lacaze et al. |
| 2007/0132249 A1 * | 6/2007 | Andrew et al. ................ 290/52 |
| 2008/0079400 A1 | 4/2008 | Lacaze |
| 2008/0315803 A1 * | 12/2008 | Yonemori et al. ............ 318/148 |
| 2009/0160187 A1 * | 6/2009 | Scholte-Wassink ............ 290/44 |
| 2011/0001318 A1 * | 1/2011 | Nelson ............................ 290/44 |

FOREIGN PATENT DOCUMENTS

| | | |
|---|---|---|
| DE | 3140241 A1 | 4/1983 |
| DE | 4438186 A1 | 5/1996 |
| DE | 10221594 A1 | 11/2003 |
| DE | 10336659 A1 | 6/2004 |
| DE | 102004016453 A1 | 11/2005 |
| DE | 102004016463 A1 | 11/2005 |
| DE | 102004016464 A1 | 11/2005 |
| EP | 0257385 A1 | 3/1988 |
| EP | 0858153 A1 | 8/1998 |
| EP | 1199794 A1 | 4/2002 |
| EP | 1199794 A2 | 4/2002 |
| EP | 1253388 A | 10/2002 |
| GB | 937717 A | 9/1963 |
| JP | 62-077098 A | 4/1987 |
| JP | 6277098 A | 4/1987 |
| JP | 2002227660 A | 8/2002 |
| JP | 2004-208496 A | 7/2004 |
| JP | 2006-506037 A | 2/2006 |
| WO | 2004045058 A1 | 5/2004 |
| WO | 2005047789 A2 | 5/2005 |
| WO | 2005124985 A1 | 12/2005 |
| WO | 2006103159 A1 | 5/2006 |

OTHER PUBLICATIONS

F. Joos et al. "Field Experience With the Sequential Combustion System of the GT24/GT26 Gas Turbine Family" ABB Review No. 5, p. 12-20 (1998)).

* cited by examiner

METHOD FOR OPERATING A POWER PLANT

CROSS REFERENCE TO RELATED APPLICATIONS

This application is a continuation of International Application No. PCT/EP2008/051634 filed Feb. 12, 2008, which claims priority to Swiss Patent Application No. 00248/07, filed on Feb. 14, 2007, the entire contents of all of which are incorporated by reference as if fully set forth.

FIELD OF INVENTION

The present invention relates to the field of power plants. Specifically, it relates to a method for operating a power plant.

BACKGROUND

Large power stations with outputs in the range of more than 100 MW in which a current-generating generator is driven by a gas turbine and/or steam turbine and feeds the generated electrical output into an electrical grid with given grid frequency (e.g., 50 or 60 Hz) typically have a fixed coupling between the (mechanical or aerodynamic) rotational speed of the turbine and the grid frequency. The output of the generator is connected by a grid connection at a locked frequency to the electrical grid, while it is driven by the turbine either directly (single-shaft arrangement) or via a mechanical gearbox coupled in terms of rotational speed. Such configurations of power stations are illustrated in a greatly simplified form in FIGS. 2 and 3. Only fixed transmission ratios between the grid frequency and turbine can be realized when gearboxes are utilized. However, solutions are also conceivable in which the generator is driven by a power turbine that can be driven with a rotational speed deviating from that of the actual gas turbine.

In a greatly simplified diagram, FIG. 1 shows a power station 10' of known type that generates current by a gas turbine 12 coupled to a generator 18 and feeds it into an electrical grid 21. The gas turbine 12 and the generator 18 are connected by a common shaft 19 and form a single-shaft turbine shafting 11. In the simplest case, the gas turbine comprises a compressor 13 that draws in and compresses combustion air by an air inlet 16. The compressor 13 can be composed of several sub-compressors that are connected one behind the other and that work at increasingly greater pressure levels and optionally allow intermediate cooling of the compressed air. The combustion air compressed in the compressor 13 is led into a combustion chamber 15 into which liquid fuel (e.g., oil) or gaseous fuel (e.g., natural gas) is injected by a fuel feed 17 and combusted under the consumption of combustion air.

The hot gases discharged from the combustion chamber 15 are expanded in a subsequent turbine 14 under work and thereby drive the compressor 13 and the connected generator 18. The exhaust gas that is still relatively hot at the outlet of the turbine can also be sent through a subsequent heat recovery steam generator 23, in order to generate, in a separate water-steam circuit 25, steam for the operation of a steam turbine 24. Such a combination is designated as a combined cycle power station. The steam turbine 24 can be coupled with the generator 18 on the side opposite the turbine 14. However, it can also drive a separate generator.

In the single-shaft arrangement of FIG. 1, the rotational speed of the gas turbine 12 is at a fixed ratio with respect to the frequency of the AC voltage that is generated in the generator 18 and that must be equal to the grid frequency of the electrical grid 21. For large gas-turbine units that are typical today with outputs greater than 100 MW, a rotational speed of the gas turbine of 3600 rpm (e.g., gas turbine Model GT24 by the Assignee of the present application) is allocated to the generator frequency or grid frequency of 60 Hz and a rotational speed of 3000 rpm (e.g., gas turbine Model GT26 by the Assignee of the present application) is allocated to the generator frequency of 50 Hz.

If a different ratio is to be achieved between the rotational speed of the gas turbine 12 and the generator or grid frequency, then a mechanical gearbox 26 that is typically formed as a reducing gearbox and thus allows higher rotational speeds and smaller constructions of the gas turbine 12 can in principle be inserted, according to FIG. 2 in a power station 10", between the shaft 19 of the gas turbine 12 and the generator 18 (turbine shafting 11'). Such mechanical gearboxes 26, however, can be used only for outputs up to 130 MW for reasons of stability. On the other hand, large outputs for each gas turbine of greater than 100 MW and high degrees of efficiency are achieved, above all, with relatively low-speed single-shaft machines.

The following disadvantages result from the rigid coupling between the turbine rotational speed and the grid frequency:
  A stable operation on the electrical grid is possible only to a limited extent.
  It leads to output drop-offs in the turbine or to thermal and mechanical loading in the dynamic control for grid-frequency support by raising the gas-turbine inlet temperature.
  Grid frequency-independent or load-independent output control of the power station is not possible.
  Grid frequency-independent or load-independent efficiency optimization of the power station is not possible.
  Grid frequency-independent or load-independent partial-load optimization of the power station is not possible.
  Emissions control of the gas turbine is possible only to a limited extent.
  Conventionally, in the case of an under-frequency event, the power station first loses output; only after equalization of the insufficient output through corresponding readjustment can the power station actively support the electrical grid through excess output. Conversely, in the case of an over-frequency event, the power station first increases output; only after equalization of the excess output through corresponding readjustment can the power station actively support the electrical grid through output reduction.
  Transients are produced for fluctuations in frequency:
    In the case of an under-frequency event, as the first step, the intake mass flow is reduced; this leads (at first for constant fuel mass flow) to over-firing and usually shortly thereafter to under-firing due to corrective action.
    Analogously, in the case of an over-frequency event, there is under-firing followed by over-firing.
    These transients lead to reduced service life and increased emissions (NOx in the case of over-firing and CO in the case of under-firing).
    For frequency support, in the case of an under-frequency event, the hot-gas temperature is increased with the disadvantageous consequences of reduced service life of the components as well as increased $NO_x$ emissions.

From U.S. Pat. No. 5,694,026, a single-shaft turbine generator set without a step-down gear is known, in which a static frequency converter is arranged between the output of the generator and the electrical grid, wherein, with the help of this frequency converter, the AC voltage frequency generated by the generator is converted to the frequency of the electrical grid. When the gas turbine is started, the generator is used as a motor that is supplied with energy from the electrical grid via the static frequency converter.

From U.S. Pat. No. 6,979,914, a power station with a single-shaft arrangement made from a gas turbine and generator is known in which a converter is similarly provided between the generator output and the electrical grid, in order to adapt the AC voltage generated by the generator to the grid frequency.

From the article by L. J. J Offring a, et al. "A 1600 kW IGBT Converter With Interphase Transformer For High Speed Gas Turbine Power Plants," Proc. IEEE-IAS Conf. 2000. 4, 8-12 Oct. 2000, Rome, 2000, pp. 2243-2248, a power station with a high speed gas turbine (18,000 rpm) and comparatively smaller output power (1600 kW) is known, in which frequency decoupling between the generator and electrical grid is realized by a converter.

Special control and operating concepts for supporting the grid frequency, however, are not to be taken from these publications.

SUMMARY

The present disclosure is directed to a method for operating a power station with turbine shafting. The station includes a gas turbine and a generator that is driven directly by the gas turbine and that generates alternating current with an operating frequency. The output of the generator is in connection with an electrical grid with given grid frequency, an electronic decoupling apparatus or variable electronic gearbox is arranged between the generator and the grid. The decoupling apparatus decouples the operating frequency from the grid frequency. The method includes maintaining a constant mechanical or aerodynamic rotational speed of the gas turbine in the event of longer-lasting changes in the grid frequency, and adjusting the output of the gas turbine without a delay.

BRIEF DESCRIPTION OF THE DRAWINGS

The invention shall be explained in greater detail below with reference to embodiments in connection with the drawings in which.

DETAILED DESCRIPTION OF THE PREFERRED EMBODIMENTS

Introduction to the Embodiments

Figure 1:
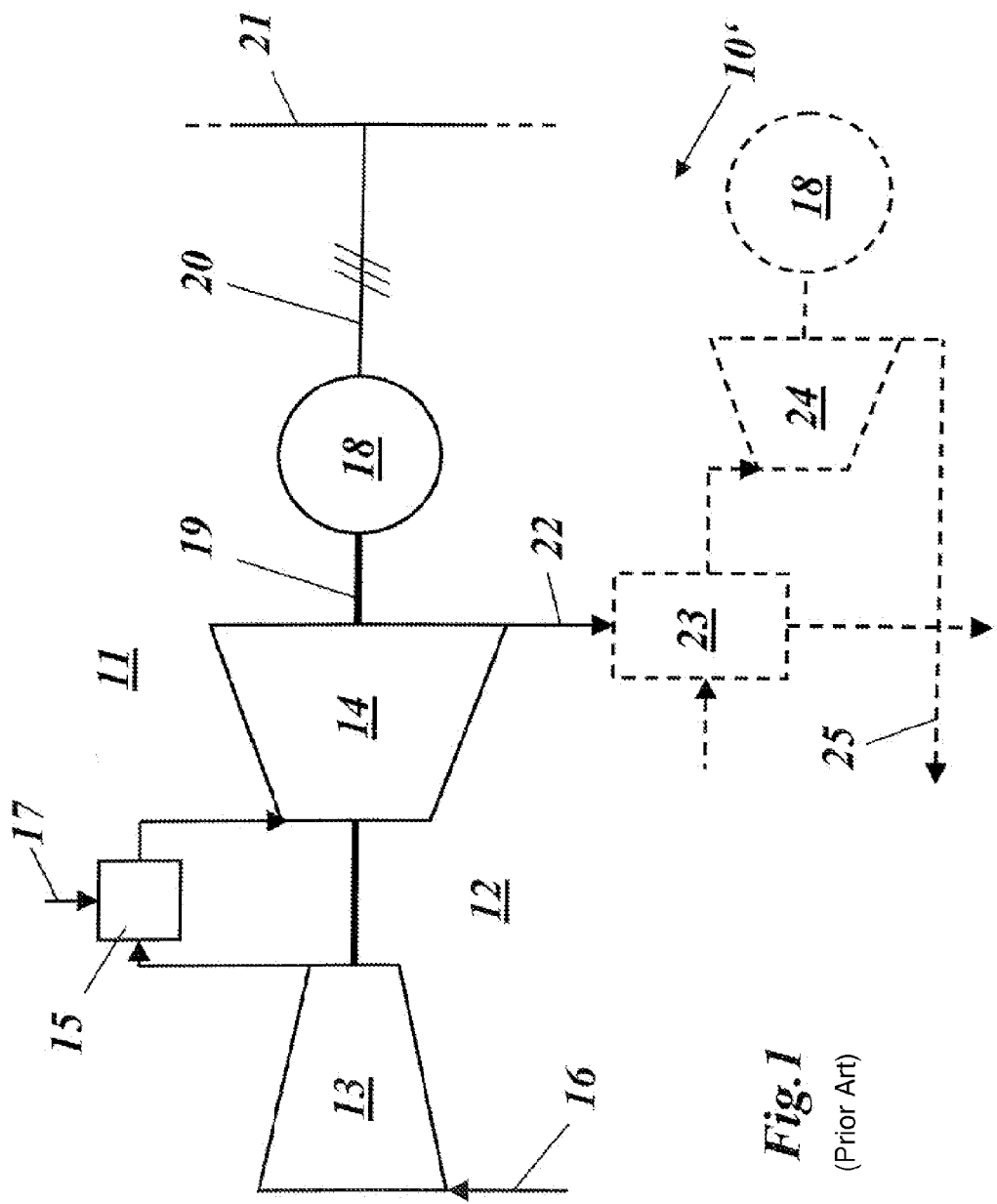
FIG. 1 is a greatly simplified circuit diagram of a power station with a gas turbine and a single-shaft turbine train according to the state of the art.

The objective of the disclosure is to create a method for operating a frequency-decoupled power station that prevents transients and that distinguishes itself, in particular, through reduced emissions and increased service life of the station components.

According to the disclosure, during longer-lasting changes in the grid frequency, the mechanical or aerodynamic rotational speed of the gas turbine is held constant and the output of the gas turbine is adjusted without a delay. In contrast to sudden changes in the grid frequency like those generated, for example, by the tripping of a power station or by the connection of a large load within a few seconds or a few tens of seconds, longer-lasting changes in the grid frequency are understood to be events in which the grid frequency is operated quasi-stationary over a long time period at a reduced frequency. In this context, longer-lasting changes are usually understood as time periods of greater than 30 s. However, these could also last up to several minutes, in special cases even up to hours.

According to one embodiment of the disclosure, a gas turbine is used with an output greater than 100 MW and, as the electronic decoupling apparatus, a frequency converter in the form of a matrix converter is used.

A different embodiment distinguishes itself in that the operating frequency clearly differs from the grid frequency or second operating frequency, where, in particular, the grid frequency or the operating frequency equals 50 Hz or 60 Hz. In general, for this configuration, deviations of more than 5% are understood as a clear differentiation between the grid frequency and operating frequency. For the use of 50 Hz power stations in 60 Hz electrical grids and vice versa, differences on the order of magnitude of 20% are to be expected. For the use of slow-moving heavy machinery, the deviation can also be significantly greater than 100%.

Preferably, a gas turbine with sequential combustion is also used as the gas turbine.

Furthermore, it is advantageous when the matrix converter that is used comprises a plurality of controllable, bidirectional switches that are arranged in an (m×n) matrix and that, controlled by a closed-loop control system, connect m inputs selectively with n outputs, where m is greater than n, and wherein a first device is provided for determining the polarity of the currents in the inputs and a second device is provided for determining the polarity of the voltages between the inputs, and wherein the first and second devices are in active connection with the closed-loop control system. Bidirectional switches can be comprised of one component but can also be constructed from several components. For example, two back-to-back parallel-connected thyristors with opposite switch-through directions could be used as controllable, bidirectional switches. The devices for determining the polarity of currents and voltages can be, for example, current or voltage meters. Alternatively, e.g., binary transmitters that output only the polarity could be used.

DETAILED DESCRIPTION

Figure 2:
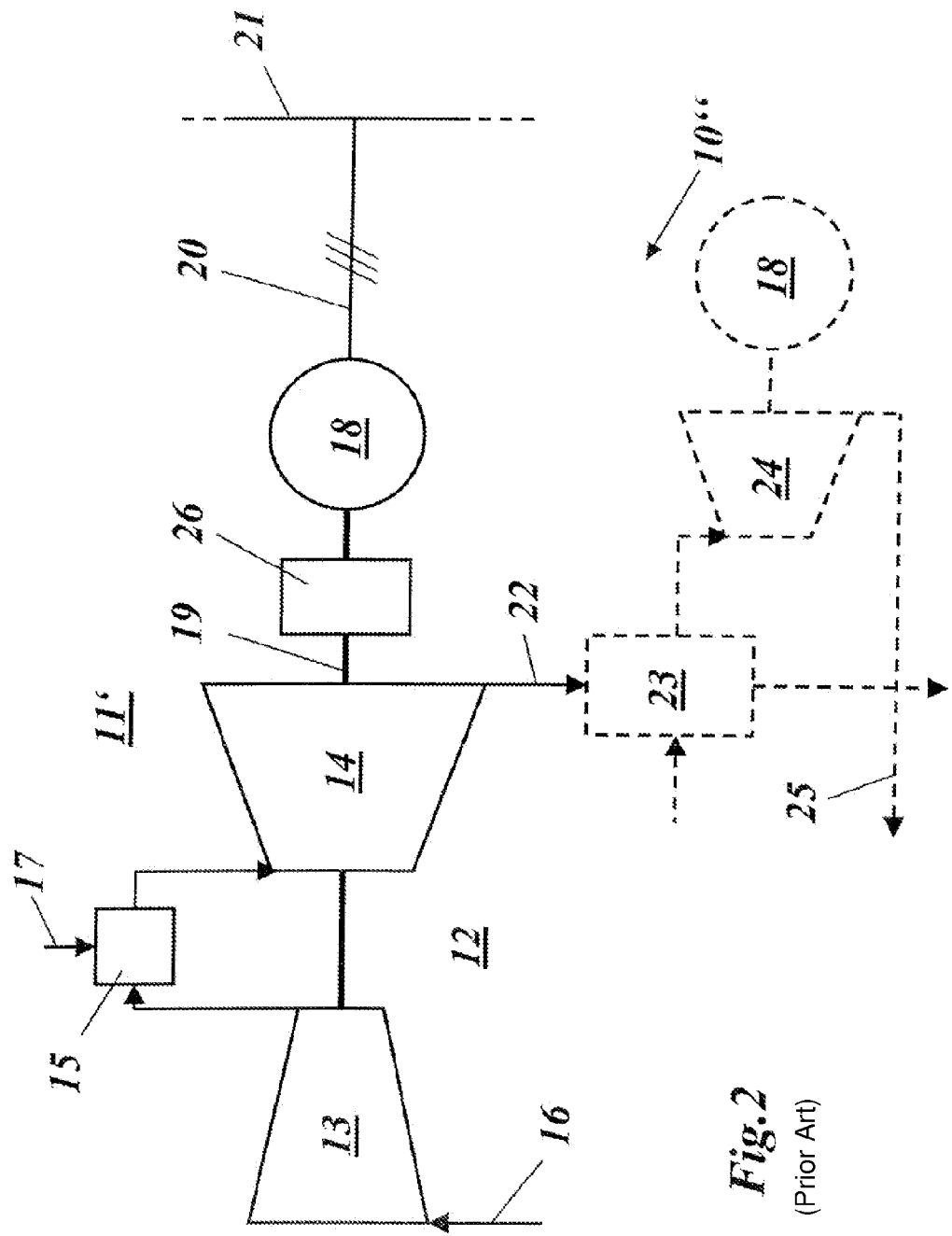
FIG. 2 is a greatly simplified circuit diagram of a power station with a gas turbine and a mechanical gearbox according to the state of the art.
Figure 3:
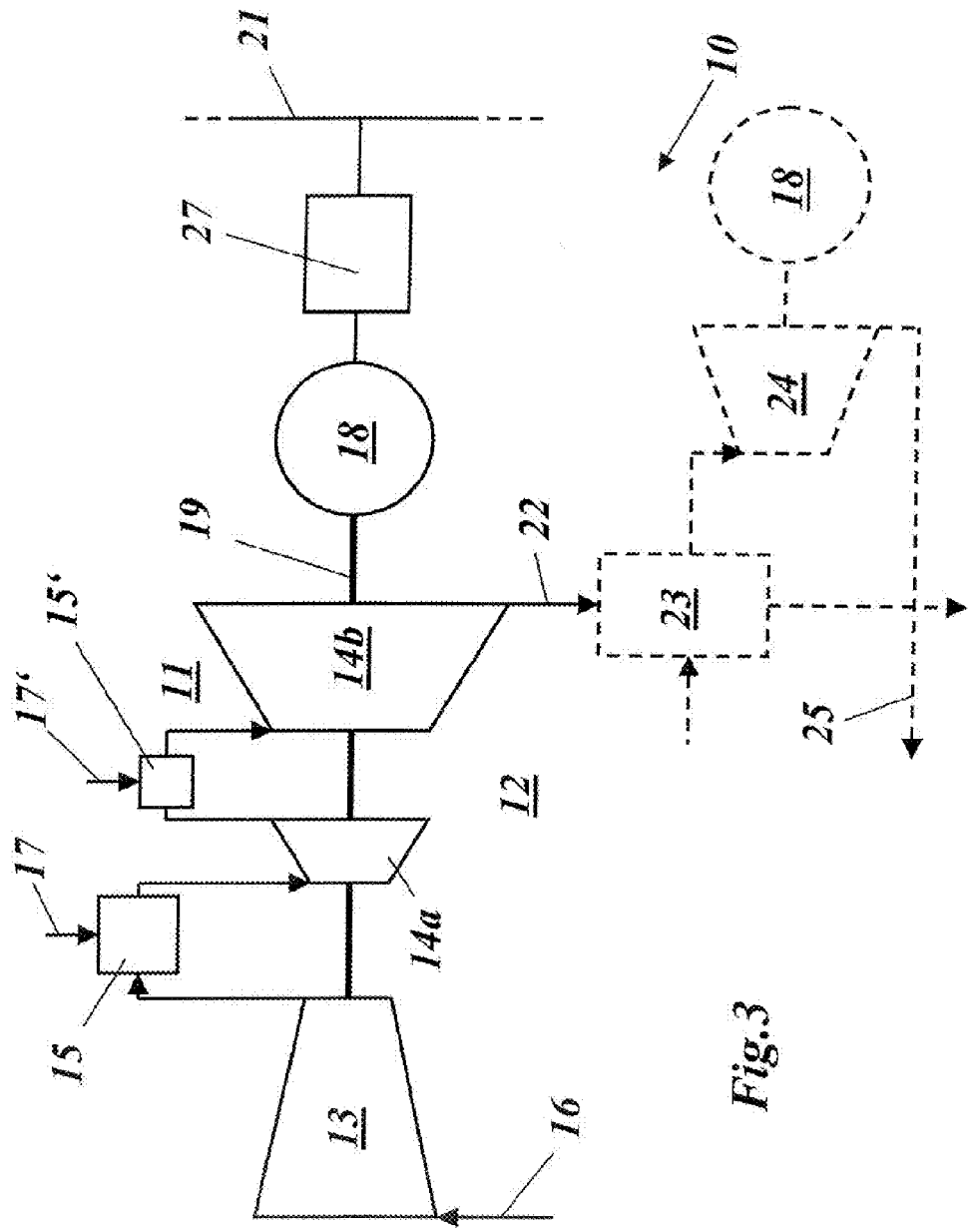
FIG. 3 is a greatly simplified circuit diagram of a power station with a gas turbine and an electronic decoupling apparatus or variable electronic gearbox, as it can be used for implementing the invention.

In FIG. 3, in a greatly simplified circuit diagram, a power station with a gas turbine and an electronic decoupling apparatus is illustrated, like that which is suitable for executing the method according to the disclosure. The power station 10 comprises a gas turbine 12 with a compressor 13 and sequential combustion, in which a first combustion chamber 15 with a first fuel, via a first fuel supply 17, generates hot gas that is expanded in a first turbine 14a and that is then led into a second combustion chamber 15', where it causes, with a second fuel via a second fuel supply 17', intermediate heating of the hot gas that is then expanded in the second turbine 14b. Instead of the sequential combustion that is especially favorable in terms of efficiency, however, single-stage combustion could also be provided. The remaining parts of the station correspond to the parts with the same reference symbols in FIG. 1 or 2.

The generator 18 is coupled directly to the shaft 19 of the gas turbine 12. Thus, the generator 18 rotates at the same rotational speed as the gas turbine 12. However, between the output of the generator 18 and the electrical grid 21 there is an electronic decoupling apparatus 27 that decouples the operating frequency generated in the generator 18 or the rotational speed of the gas turbine 12 from the given grid frequency of the electrical grid.

Figure 4:
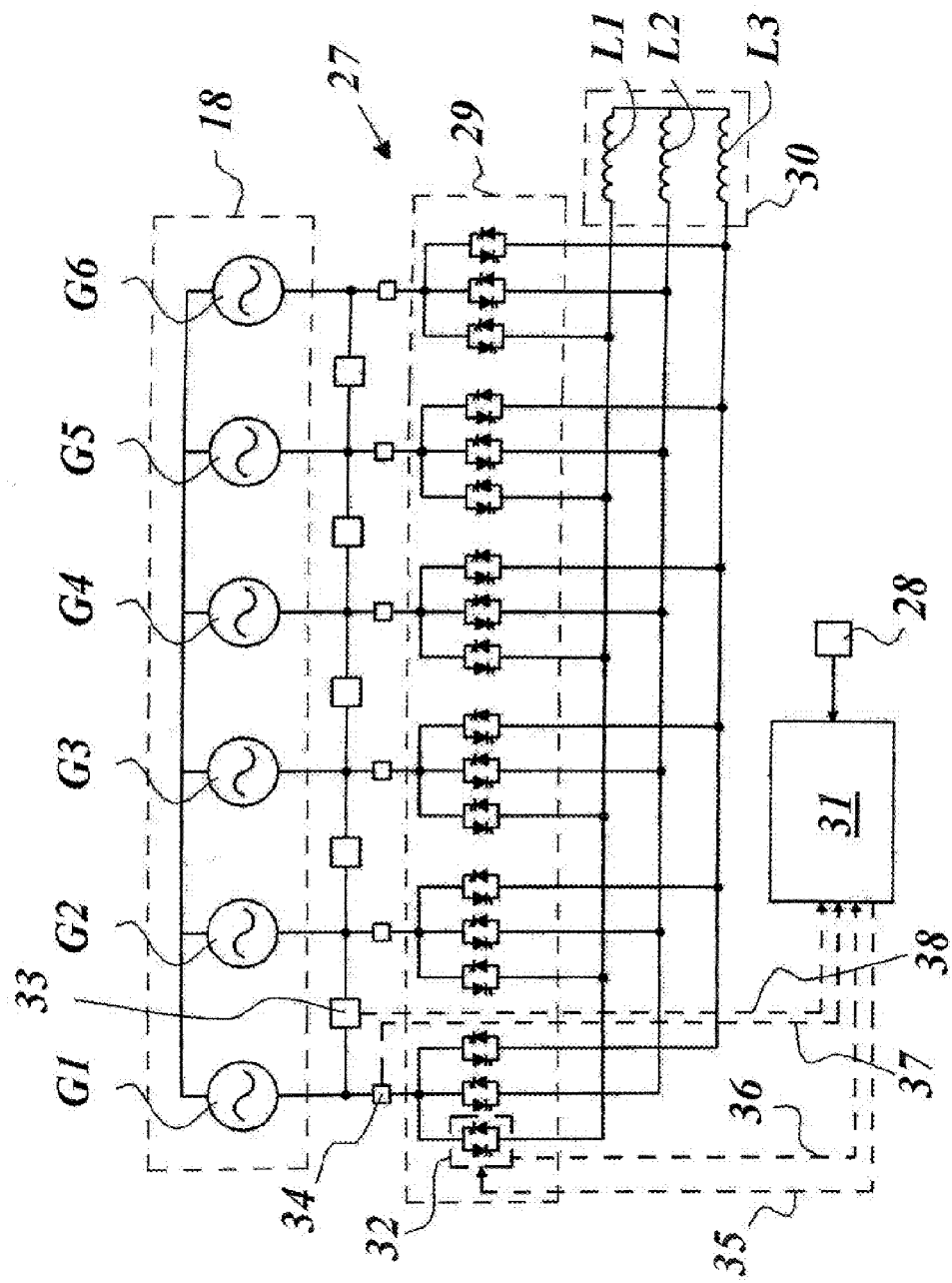
FIG. 4 shows an example of the internal design of a matrix converter, as can be used as an electronic decoupling apparatus or variable electronic gearbox in a system according to FIG. 3.

The electronic decoupling apparatus 27 is advantageously formed as a matrix converter without a DC intermediate circuit—in order to limit the dissipation power. The configuration and function of such a matrix converter that features an especially low-loss operation due to its control has been described in EP-A2-1 199 794. Additional embodiments for such a matrix converter have been disclosed in EP-A1-1 561 273, DE-A1-10 2004 016 453, DE-A1-10 2004 016 463, and DE-A1-10 2004 016 464. In FIG. 4, a basic circuit diagram of a matrix converter is shown with six input phases and three output phases. The matrix converter 27 connects, in a time sequence, six phases G1, . . . , G6 of a generator 18 as a source with three phases L1, . . . , L3 of a load 30. The power section 29 required for this purpose comprises 18 bidirectional switches 32 in the form of back-to-back parallel-connected switched thyristors (in the general case, there are m×n switches for m input/source phases and n output/load phases). The switches 32 are arranged in a (6×3) matrix. For the control of the switches 32, a control circuit or controller 31 is provided that receives time signals (a clock frequency) from a timer 28. The switching state of the switches 32 (ON, OFF) is monitored and reported via a first signal line 36 to the controller 31. The switches 32 are each controlled by the controller 31 via control line 35.

In each of the individual phases G1, . . . , G6 of the generator 18, a current measurement device 34 is arranged that reports the sign of the phase current via a second signal line 37 to the controller 31. Furthermore, between the phases G1, . . . , G6 of the generator 18 there are voltage measurement devices 33 that report the polarity of the corresponding phase differential voltage via a third signal line 38 to the controller 31. For the details of the operating sequence of the matrix converter, refer to the publications named above.

With the decoupling apparatus 27, in particular, in the form of a matrix converter of the described type, the following advantages of electronic decoupling are produced:

Support of the grid frequency of the electrical grid 21 is possible in a wide grid frequency range. While, for rigid frequency coupling, grid frequency support in the range of 5-6% of the grid frequency can be achieved, through electronic decoupling, support in the range of up to 20% can be achieved.

Adaptation to optimum operating values (output, efficiency) is possible as a function of environmental conditions (e.g., inlet temperature).

The output can be increased.

The efficiency can be improved.

Flexibility in the event of load fluctuations and the service life of the turbine can be improved.

The turbine can be run, furthermore at a constant rotational speed. Previous additional thermal or mechanical loads that were necessary due to measures for supporting the rotational speed are eliminated.

The emission values can be improved. The additional degree of freedom of a variable rotational speed allows a desired output to be started at a higher or lower rotational speed. Associated with this are lower or higher turbine inlet temperatures with the effect of influencing the emissions of $CO_2$ and NOx. In particular, increased emissions in the event of frequency support can be avoided.

The primary possibility of being able to operate, according to the disclosure, turbine shafting—turbine and generator—within a power station independent of the grid frequency with stability at a desired (designed) rotational speed supports the stabilization of power grids. In the event of frequency drop-offs, the power station must be in the position to maintain the power output at a normal grid frequency or, ideally, even to output increased power to the power grid. Previous power station systems could guarantee this only to a limited degree. A system coupled rigidly with the grid frequency perceives the grid frequency reduction as an undesired rotational-speed reduction on the turbine and the generator. Here, the output power decreases for otherwise equal operating parameters. In this case, a gas turbine system reacts with a significantly increased fuel supply that leads to an increased hot-gas temperature within the turbine. This considerably reduces, in turn, the service life of the turbine, which increases the operating costs of the station. Pollutant emissions, in the form of $NO_X$, also increase significantly in this operating phase. Thus, two limits have already been defined that greatly limit a power increase in the event of a grid frequency drop—service life and emissions. As a third aspect, the mechanical compatibility plays a role. Large frequency drops greater than 6% lead to the shutdown of power stations, because the stations are not in the position mechanically to be able to be operated at correspondingly reduced rotational speeds.

In the case of a grid frequency decoupled system, all of the disadvantages named above are eliminated. There is no limitation with respect to minimum permissible frequency fluctuations, because the turbine shafting notices no pronounced fluctuation in rotational speed. Consequently, there are no increases in pollutants and no reduction in service life.

Another positive aspect of a grid frequency independent power station system is the better ability to adapt a station to different site conditions. The already mentioned grid stability is an essential aspect that depends decisively on the site. In addition to this are, above all, different environmental conditions, such as outside temperatures, air humidity, and also fuel composition, which influence the operating state of a power station. The additional degree of freedom of the grid frequency-independent rotational speed control allows it to generate optimized operating conditions corresponding to the current environmental conditions. Here, both efficiency improvements or also power increases are possible.

As already mentioned above, through the rotational speed-related decoupling of the gas turbine from the grid frequency or the operating frequency of a connected load, an improved operation of the gas turbine is possible. The gas turbine is operated in all of the operating ranges independent of the grid frequency or operating frequency of the load as close as possible to the designed aerodynamic rotational speed value, in order to optimize the performance, i.e., efficiency and output.

Figure 5:
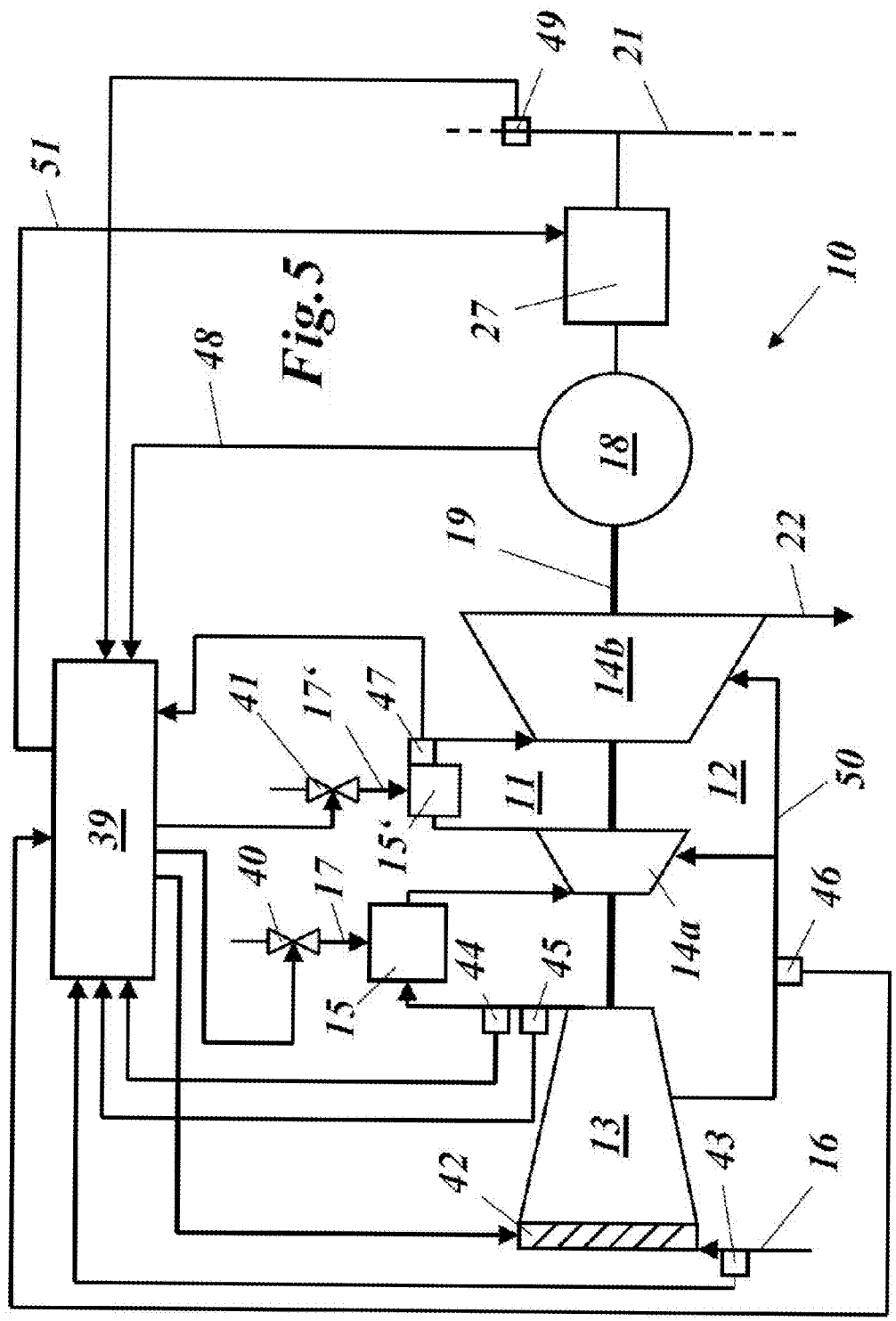
FIG. 5 shows an installation comparable to FIG. 4 of devices for executing the method according to the disclosure.

In FIG. 5, a simplified schematic of a power station 10 is illustrated that is designed for an operating method according to the disclosure. The turbine shafting 11 with the gas turbine 12 and the generator 18 corresponds to that in FIG. 4. This also applies to the electronic decoupling apparatus 27 and the connected electrical grid 21. The electric grid 21 could be a general power supply grid, but could also be a railway power supply grid. The illustration of a possible, additional steam turbine with corresponding water/steam circuit has been eliminated here for reasons of space.

For the control or regulation of the gas turbine 12, a series of adjustable compressor guide vanes 42 is used at the input of the compressor, as well as control valves 40 and 41 in the fuel supply 17 and 17' to the combustion chambers 15, 15', respectively. The corresponding control signals come from a controller or closed-loop control system 39 according to the magnitudes of certain input parameters that can be used individually or in selectable combinations. One possible parameter is the compressor inlet temperature that is measured with a first transducer 43 arranged at the air inlet 16. Other possible parameters are the compressor end temperature and the compressor end pressure that are measured with second and third transducers 44 and 45, respectively, at the output of the compressor. Another transducer 46 that is arranged at a cooling air supply 50 from the compressor 13 to thermally loaded components of the gas turbine 12, e.g., into the two turbines 14a and 14b, measures the pressure and/or the temperature and/or the throughput of the cooling air. Another transducer 47 can be arranged at the second combustion chamber 15', in order to measure the pressure in this combustion chamber. The rotational speed of the gas turbine 12 can be sensed, for example, on the generator 18 and input via a measurement line 48 into the closed-loop control system 39. A grid frequency sensor 49 can be provided for the measurement of the grid frequency in the electrical grid 21.

The closed-loop control system 39 can then control the aerodynamic or mechanical rotational speed of the gas turbine 12 to a constant value, without the rotational speed being influenced in another way by the grid frequency of the electrical grid 21.

The control of the gas-turbine rotational speed can be performed with complete decoupling of the gas turbine 12 from the electrical grid 21 at the gas turbine 12 by corresponding parameters, such as fuel mass flow and position of the compressor inlet row. Alternatively, the control of the rotational speed can also take place, for example, such that the target rotational speed 51 calculated in the closed-loop control system 39 of the gas turbine is transmitted to the controller 31 of the decoupling apparatus 27 and the rotational speed is imposed on the gas turbine 12 via the generator. The generator 18 is in this case supported via the decoupling apparatus 27 with respect to the electrical grid 21, which is quasi-static in comparison with the gas turbine 12 and imposes the rotational speed $n_{mech}$ through the control of the frequency relationship between the grid frequency F and the mechanical rotational speed $n_{mech}$ of the gas turbine. In this case, the decoupling apparatus 27 works as a variable gearbox with controlled step-up ratio between the mechanical rotational speed of the gas turbine $n_{mech}$ and grid frequency F.

In the event of fluctuations in the grid frequency, the gas turbine runs independent of the grid frequency according to the designed aerodynamic rotational speed. Through this concept, improvements in the operating behavior and service life of the gas turbine are achieved in the following points:

Conventionally, in the event of an under-frequency, the power station first loses output; only after equalizing the insufficient output through corresponding readjustment can the power station actively support the electrical grid through excess output. In contrast, in the event of an over-frequency, the power station first increases output; only after equalizing the excess output through corresponding readjustment can the power station actively support the electrical grid through output reduction.

In the novel concept, these delays are eliminated and the power station can load immediately from the current load point and can support the frequency.

Reduction of transients in the event of frequency fluctuations:

In the event of an under-frequency, the intake mass current is first reduced; this leads (at first for constant fuel mass flow) to over-firing and shortly thereafter usually to under-firing due to the corrective action.

Analogously, in the event of an over-frequency, there is under-firing followed by over-firing.

With the novel grid frequency independent operating concept, these transients are prevented and thus the consumption of service life is reduced and emissions that necessarily appear in the event of transient operation beyond the designed rotational speed (NOx in the case of over-firing and CO in the case of under-firing) are avoided.

Figure 6:
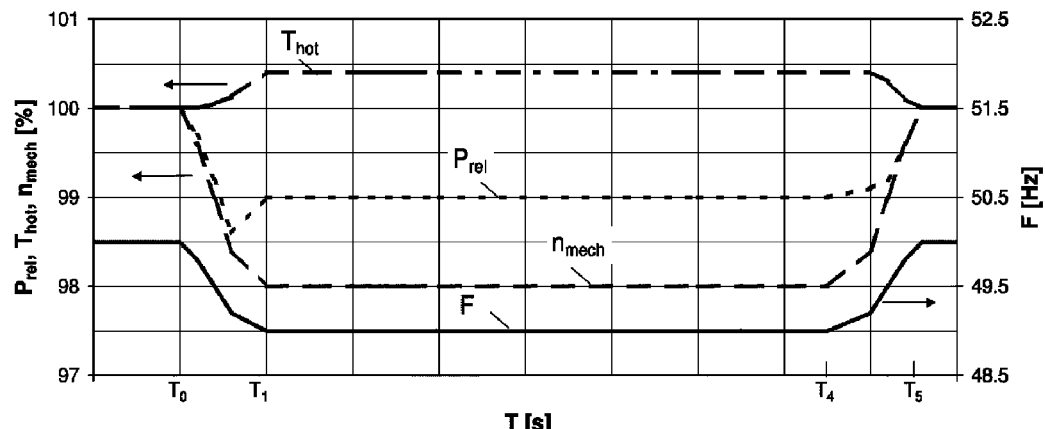
FIG. 6 depicts an under-frequency event for fixed coupling.
Figure 7:
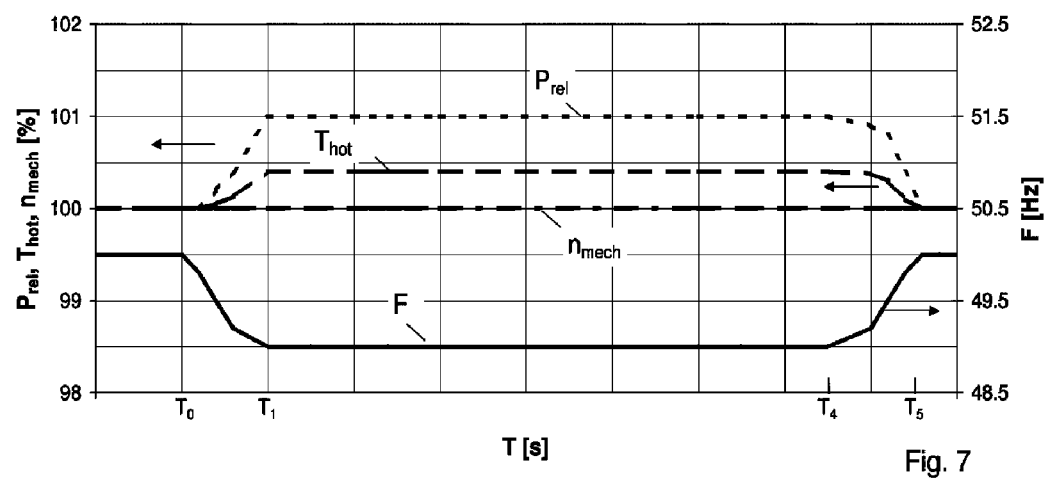
FIG. 7 depicts an under-frequency event with electronic decoupling.
Figure 8:
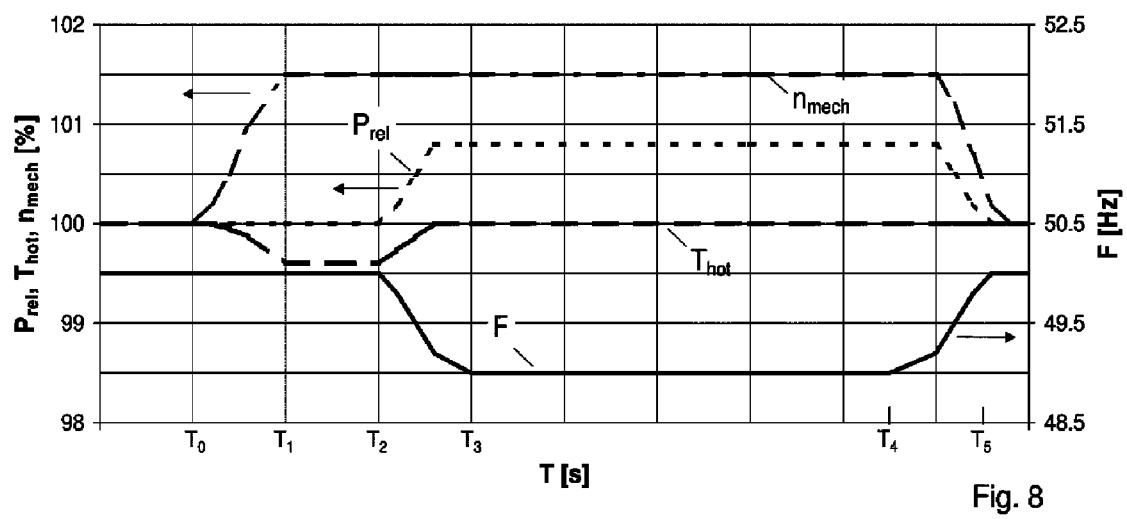
FIG. 8 depicts an under-frequency event with electronic decoupling and anticipated under-frequency event.

In FIGS. 6 to 8, examples for longer-lasting under-frequency events are shown schematically. They are described for a 50 Hz electrical grid 21, but can also be used analogously for a 60 Hz electrical grid 21 or other design frequencies. The corresponding concepts for over-frequency events are also disclosed here for someone skilled in the art through analogy. Interference signals, small high-frequency variations of the grid frequency F or noise is negligible and not shown.

In FIG. 6, the profile of a longer-lasting under-frequency event is shown schematically for a conventional station with fixed coupling between the electrical grid 21 and the gas turbine 12. The gas turbine 12 is operated up to the time $T_2$ at full load and at the designed rotational speed. Between time $T_2$ and $T_3$ the grid frequency F drops from 50 Hz to 49 Hz. For a rigid coupling to the electrical grid 21, the rotational speed $n_{mech}$ of the gas turbine 12 normalized with the designed rotational speed is reduced accordingly from 100% to 98%. If one neglects the kinetic energy of the shafting released in the case of a rotational speed reduction, then the relative power of the gas turbine $P_{rel}$ first decreases proportional to the rotational speed $n_{mech}$. In this case, $P_{rel}$ is the relative power $P_{rel}$ with respect to the full-load power at 100% rotational speed. Under the assumption that the control of the gas turbine 12 prevents an increase in the hot-gas temperature due to the intake mass flow reduced with the rotational speed drop, the hot-gas temperature $T_{hot}$ first remains constant. In this example, it is first increased with a short delay as a response of the closed-loop control system 39 to the rotational speed-related power drop. This increase of the hot-gas temperature $T_{hot}$ to 100.4% of the full load hot-gas temperature leads to the result that the power drop is partially equalized and the gas turbine (12) in this example is operated during the longer under-frequency event at 99% relative power $P_{rel}$ at only 98% normalized mechanical rotational speed $n_{mech}$.

Starting at the time instance $T_4$, at which the grid frequency F begins to recover again, the normalized mechanical rotational speed $n_{mech}$ increases accordingly and, as a result, also the relative power $n_{mech}$ of the gas turbine 12. During the increase of the grid frequency between $T_4$ and $T_5$, the relative power of the gas turbine $P_{rel}$, the power required by the electrical grid 21 for frequency support, is exceeded and accordingly, the hot-gas temperature $T_{hot}$ is reduced again until, at the time instance $T_5$, normal full-load operation at the designed temperature is achieved.

The hot-gas temperature $T_{hot}$ can be reduced again to its designed value only when the grid frequency F returns to its nominal value 50 Hz between $T_4$ and $T_5$. An increased consumption of service life is associated with the increase of the hot-gas temperature $T_{hot}$ above the full-load value. According to the grid requirements, a compromise between providing power for frequency support and service life consumption can be reached.

FIG. 7 shows schematically the profile of the operating parameters during the same longer-lasting under-frequency event with reference to an example for a station with electrical decoupling between the electrical grid 21 and the gas turbine 12. In this case, despite the drop in the grid frequency F from 50 Hz to 49 Hz, the normalized mechanical rotational speed $n_{mech}$ of the gas turbine 12 is kept at 100%. Correspondingly, the relative power $P_{rel}$ and hot gas temperature $T_{hot}$ of the gas turbine 12 at the beginning of the under-frequency event initially remains constant immediately after $T_2$. The closed-loop control system reacts only as a reaction to a significant drop-off in the grid frequency F and increases the hot-gas temperature $T_{hot}$, in order, in this way, to increase the relative power $P_{rel}$ of the gas turbine. In this example, by increasing $T_{hot}$ to 100.4%, not only a drop in the gas-turbine power can be avoided, but also a relative power $P_{rel}$ of 101% of the full-load power can be output to the electrical grid 21. Starting at the time instance $T_4$ the grid frequency F recovers and consequently the relative power $P_{rel}$ and accordingly $T_{hot}$ can be reduced until, at the time instance $T_5$, normal full-load operation is achieved again.

In FIG. 8, the profile of an anticipated under-frequency event with electronic decoupling is shown. In this example, the operator is informed of an imminent event, such as, for example, the disconnection of a large power station from the electrical grid 21 or the connection of a large load to the electrical grid 21, which could result in a frequency drop-off. He selects an operating mode of the gas turbine 12 accordingly at the time instance $T_0$. For preparation for the under-frequency event, the mechanical rotational speed $n_{mech}$ of the gas turbine 12 is now increased and reaches, for example, 101.5% at the time instance $T_1$. In order to keep the load constant at the designed full load, the hot-gas temperature $T_{hot}$ is reduced according to the increased rotational speed $n_{mech}$. In this case, possible efficiency decreases are taken into account relative to operation at the designed rotational speed 100% and at the designed hot-gas temperature.

At the time instance $T_2$ the anticipated under-frequency event begins. Due to the decoupling of the gas-turbine rotational speed $n_{mech}$ and grid frequency F, the gas turbine 12 can continue to operate at the increased rotational speed $n_{mech}$. According to the decrease of the hot-gas temperature $T_{hot}$ performed when the rotational speed $n_{mech}$ increases between time $T_0$ and $T_1$, the hot-gas temperature $T_{hot}$ can now be increased for increasing the power to the full-load value. As a result, the gas turbine is operated at the designed hot-gas temperature with increased rotational speed $n_{mech}$ and can output a normalized power above the full-load power, in this case, for frequency support. In this example, this lies at 100.8%. This can be realized without service life decreases that are otherwise typical for frequency support. Starting at the time instance $T_4$ the grid frequency F recovers and then the relative power $P_{rel}$ and accordingly the rotational speed $n_{mech}$ can be reduced until, at the time instance $T_5$, normal full-load operation is again achieved.

For an application in a combined cycle power station, it is to be taken into account that, in order to keep the power station output constant before the anticipated under-frequency event in the period from $T_1$ to $T_2$, the gas-turbine power $P_{rel}$ must possibly be raised. Through the increased rotational speed $n_{mech}$ the mass flow and thus the pressure ratio across the turbine is increased. In addition, the hot-gas temperature of the gas turbine is decreased. Both result in a decrease of the turbine outlet temperature, which could negatively affect the power of the steam turbine despite the increased exhaust gas mass flow.

If the hot-gas temperature $T_{hot}$ was further increased past the designed value, like in the examples of FIG. 6 and FIG. 7, during the under-frequency event, with the acceptance of service life decreases typical for frequency support, then the power of the gas turbine $P_{rel}$ would increase even farther past the full-load value.

According to the operating state of the gas turbine and the driving concept of the gas turbine 12, compensation of the power increase associated with a rotational speed increase is realized not by way of $T_{hot}$, but instead by way of a different control parameter, such as, for example, the adjustable compressor guide vanes 42, or a combination of control parameters.

The relative powers $P_{rel}$ shown in the figures relate to the power for quasi-stationary operation. The dynamic power section like that appearing for a change in rotational speed of the shafting is negligible.

Analogous driving concepts are conceivable for gas turbines 12 with sequential combustion. Here, in principle there is the possibility of using the $T_{hot}$ values of both combustion chambers 15, 15' for the control or to change the $T_{hot}$ value of only one combustion chamber 15, 15'. The combinations with other parameters is also provided here according to the driving concept and operating point.

Additional processing parameters, such as mass flows, compressor pressure, compressor outlet temperature, cooling air temperatures, and pressures, as well as the exhaust gas parameters change in the way known to someone skilled in the art as a function of the selected driving concept.

The relationships of the effects of rotational speed $n_{mech}$ and hot-gas temperature $T_{hot}$ on the gas turbine power $P_{rel}$, as well as the dynamic profile of the control, are strongly dependent on the construction type of the gas turbine 12 and the implemented closed-loop control system and control parameters. For example, the effect of the hot-gas temperature $T_{hot}$ of a second combustion chamber 15' in a gas turbine 12 with sequential combustion is significantly higher than the effect of a first combustion chamber 15. Depending on the design criteria of the gas turbine 12, such as, for example, the mechanical, aerodynamic, and cooling requirements, as well as the grid requirements, the driving concept of the gas turbine 12 can be optimized according to the shown embodiments. Here, the driving concepts are not limited to the shown examples, but instead can be combined and expanded by someone skilled in the art according to the requirements.

LIST OF REFERENCE SYMBOLS

10, 10', 10" Power station
11, 11' Turbine shafting
12 Gas turbine
13 Compressor
14, 14a, 14b Turbine
15, 15' Combustion chamber
16 Air inlet
17, 17' Fuel supply 18 Generator
19 Shaft
20 Grid connection (frequency-coupled)
21 Electrical grid
22 Exhaust gas outlet
23 Heat recovery steam generator
24 Steam turbine
25 Water/steam cycle
26 Gearbox (mechanical)
27 Decoupling apparatus or variable electronic gearbox
28 Timer
29 Power section
30 Load
31 Controller
32 Switch (bidirectional)
33 Voltage measurement device
34 Current measurement device
35 Control line
36, . . . , 38 Signal line
39 Closed-loop control system
40, 41 Control valve
42 Adjustable compressor guide vanes
43, . . . , 47 Transducer
48 Measurement line (rotation speed)
49 Grid frequency sensor
50 Cooling air supply
51 Generator target rotation speed
$T_{hot}$ Hot gas temperature at turbine inlet of the gas turbine
$P_{rel}$ relative load of the gas turbine
$n_{mech}$ normalized mechanical speed of the gas turbine
F grid frequency in Hz
$T_0$ time instance: start raising the rotational speed of the gas turbine $n_{mech}$
$T_1$ time instance: the rotational speed of the gas turbine $n_{mech}$ is raised
$T_2$ time instance: begin of grid frequency reduction
$T_3$ time instance: grid frequency is reduced
$T_4$ time instance: grid frequency starts to recover
$T_5$ time instance: grid frequency is back to nominal design value
G1, . . . , G6 Phase (generator)
L1, . . . , L3 Phase (load)

What is claimed is:

1. Method for operating a power station, having turbine shafting, comprising a gas turbine and a generator that is driven directly by the gas turbine and that generates alternating current with an operating frequency, the output of the generator is in connection with an electrical grid with given grid frequency, an electronic decoupling apparatus or variable electronic gearbox is arranged between the generator and the grid, the decoupling apparatus decouples the operating frequency from the grid frequency, the method comprising:

maintaining a constant mechanical or aerodynamic rotational speed of the gas turbine in the event of longer-lasting changes in the grid frequency; and
adjusting the output of the gas turbine without a delay.

2. The method according to claim 1, wherein a gas turbine with an output greater than 100 MW is used and a frequency converter in the form of a matrix converter is used as the electronic decoupling apparatus.

3. The method according to claim 1, wherein the operating frequency of the gas turbine clearly differs from the grid frequency.

4. The method according to claim 3, wherein the grid frequency or the operating frequency of the gas turbine equals 50 Hz or 60 Hz.

5. The method according to claim 1, wherein a gas turbine with sequential combustion is used as the gas turbine.

6. The method according to claim 2, wherein the matrix converter comprises a plurality of controllable, bidirectional switches that are arranged in an (m×n) matrix and that, controlled by a controller, connect m inputs selectively to n outputs, wherein m is greater than n and wherein a first device for determining the signs of the currents in the inputs is provided and a second device for determining the signs of the voltages between the inputs is provided, and wherein the first and second devices are connected to the controller by signal lines.

7. The method according to claim 1, wherein, in the event of grid frequency fluctuations, peaks in emissions are avoided by the electronic decoupling apparatus.

8. The method according to claim 1, wherein the rotational speed of the gas turbine is raised before an anticipated under-frequency event.

9. The method according to claim 1, wherein the rotational speed of the gas turbine is reduced before an anticipated under-frequency event.

10. The method according to claim 8, wherein the power-station output is kept constant during the adaptation of the rotational speed of the gas turbine.

11. The method according to claim 9, wherein the power-station output is kept constant during the adaptation of the rotational speed of the gas turbine.

12. The method according to claim 10 wherein the power-station output is kept constant by adapting the turbine inlet temperature and/or the position of the adjustable compressor guide vanes of the gas turbine.

13. The method according to claim 11 wherein the power-station output is kept constant by adapting the turbine inlet temperature and/or the position of the adjustable compressor guide vanes of the gas turbine.

14. The method according to claim 8 wherein the power-station output is kept constant before an anticipated under-frequency event and is raised above the nominal power in the case of under-frequency.

* * * * *